April 12, 1966  P. J. PRICE  3,246,324
DIGITAL RADAR TRACKING SYSTEMS
Filed Dec. 13, 1962  2 Sheets-Sheet 1

April 12, 1966  P. J. PRICE  3,246,324
DIGITAL RADAR TRACKING SYSTEMS
Filed Dec. 13, 1962  2 Sheets-Sheet 2

FIG. 3

United States Patent Office 3,246,324
Patented Apr. 12, 1966

3,246,324
DIGITAL RADAR TRACKING SYSTEMS
Peter John Price, Camberley, England, assignor to Elliott Brothers (London) Limited, Century Works, London, England, a company of Great Britain
Filed Dec. 13, 1962, Ser. No. 244,423
Claims priority, application Great Britain, Dec. 18, 1961, 42,913/61
26 Claims. (Cl. 343—7.3)

This invention relates to radar tracking systems in which it is desired to measure the time interval between the transmission of a pulse of electromagnetic energy into space and receipt of such a pulse when reflected from an object in space in order to derive a measure of the range of the object. It is usual in such radar systems to employ an analogue time interval measuring system. Analogue systems, however, suffer from several recognized disadvantages, including the problem of drift and the difficulty of providing the system with a reasonably long memory of the target velocity should the target echo be obscured temporarily.

It is an object of the present invention to provide an improved time radar tracking system which shall operate on the digital principle and which shall therefore not be subject to the disadvantages peculiar to analogue systems.

According to the present invention, a radar tracking system for deriving a measure of the range of a target as a function of the time interval between the transmission of a pulse of energy and receipt of the corresponding reflected pulse, comprises a register for storing a number which represents, at least approximately the target range, means responsive to the transmission of a pulse to commence to count the stored number digitally, means responsive both to the termination of the count and receipt of the corresponding reflected pulse to derive a number of pulses corresponding in number to the difference between the time interval represented by the stored number and the actual time interval and means for modifying the stored number in accordance with the number of derived pulses in the sense to reduce said difference.

Figure 1:
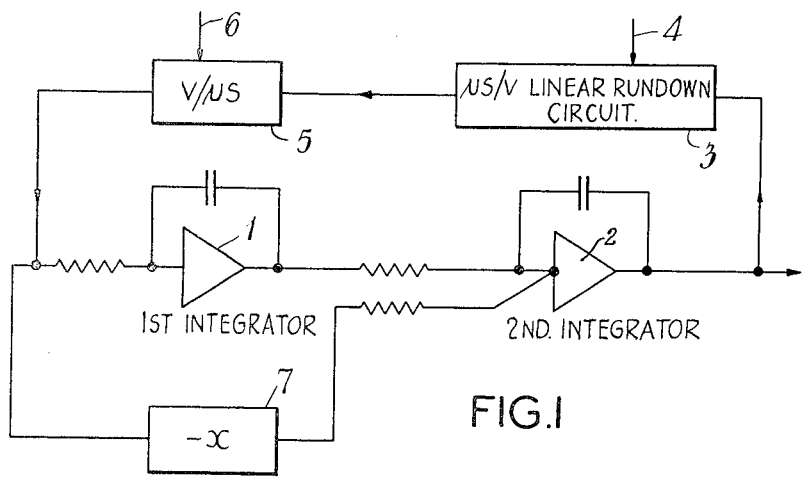
Figure 2:
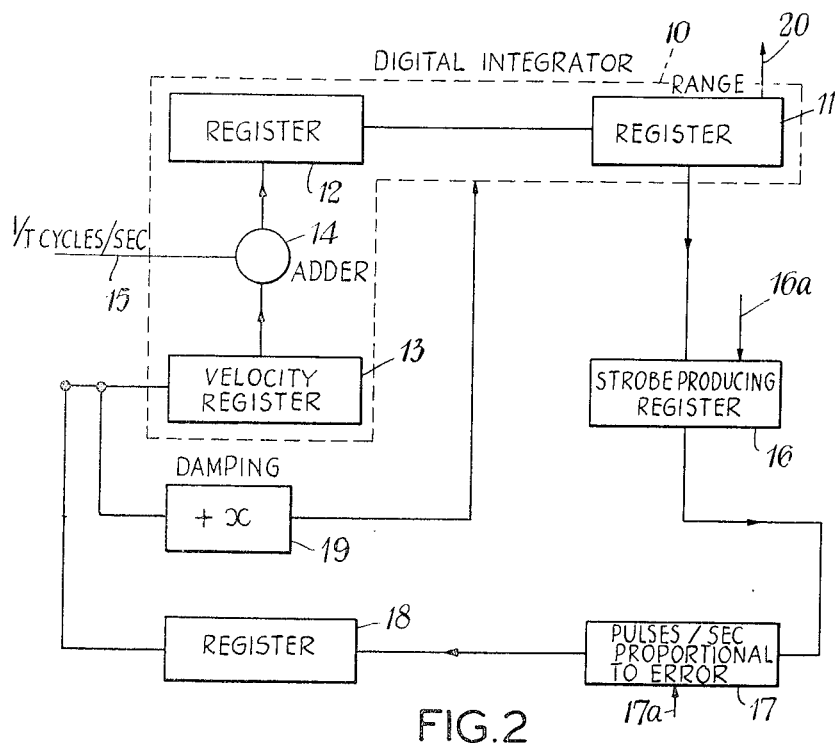

Some embodiments of the invention will now be described by way of example, reference being made to the accompanying drawings in which:

FIG. 1 is a block schematic diagram of a conventional analogue time interval measuring system for a radar tracking system, FIG. 2 is a block schematic diagram of a digital time interval measuring system for a radar tracking system according to the invention, and FIG. 3 is a block schematic diagram of a radar tracking system embodying the system illustrated in FIG. 2.

The conventional analogue time interval measuring system illustrated in FIG. 1 for measuring the range of a target in space irradiated with transmitted pulses from a suitable serial system need only be briefly described. It comprises two series connected integrators 1 and 2 the voltage output of the second of which represents the time interval between a transmitted pulse and the corresponding received pulse reflected from the target and, hence, the range of the target. This output voltage is compared in a linear rundown circuit 3 with a voltage which commences to rundown linearly from a predetermined value upon the occurrence of a transmitted pulse which is represented by a signal supplied to the rundown circuit along a line 4. When the rundown voltage in the circuit 3 corresponds with the output voltage from the integrator 2, a gating pulse is produced which is supplied to a further circuit 5 which is supplied along a line 6 with a signal representing the corresponding received pulse. This circuit 5 is such as to produce a voltage output the magnitude of which is a function of the departure in time of the received pulse from the centre of width of the gating pulse and the polarity of which corresponds to the sense of such departure. This output voltage from the circuit 5 is in effect an error voltage and is supplied to the input of the integrator 1 so as to modify the voltage output of the integrator 2 and cause it to represent and follow the actual time interval between the transmitted and received pulses. Damping is provided for the system by a feed-back connection between the input sides of integrators 1 and 2 and represented by the block 7.

This conventional system suffers from the disadvantages inherent in analogue systems such as drift problems, the absence of a satisfactory memory and limited accuracy, in particular, for long range systems.

Such disadvantages are materially reduced, if not entirely obviated by the digital system illustrated in FIG. 2 which comprises a digital integrator 10 which includes three registers 11, 12 and 13, the registers 12 and 13 being connected to each other through an adder device 14 gated by means of control pulses supplied along a line 15 at a predetermined recurrence frequency. The register 11 is intended to store a number representing a period of time corresponding, at least, approximately, to the time interval between the time of transmission of a radiated pulse of energy and the time of receipt of the corresponding reflected pulse and hence to the range of the target. This number is supplied to a strobe producing register 16 whilst at the same time being retained in the register 11. The register 16 is supplied along line 16a with a signal representing the transmitted pulse such that on the occurrence of such a transmitted pulse it commences to count down, at a predetermined rate, the number stored therein over the period of time which it represents. At the termination of countdown, i.e. when the register 16 has been emptied, suitable means (not shown) such as a monostable circuit, generates a gate pulse of predetermined width, the leading edge of which corresponds with the termination of countdown and energizes a circuit 17 to supply clock pulses to a further register 18. The circuit 17 can conveniently be a gate arranged to pass clock pulses derived from a suitable source upon the occurrence of the gate pulse. Such a gate is closed by a signal supplied thereto along a line 17a and representing the received pulse so that the number of pulses passed by the circuit 17 is proportional to the time interval between the termination of the countdown of the number stored in the register 16 and the occurrence of the received pulse and hence is a function of any error between the period of time represented by the stored number and the actual period of time between the transmitted and received pulses. These clock pulses are supplied from the register 18 to the register 13, every radar period. The register 13 is biased every radar period with a number corresponding to the number of pulses which would be passed by the circuit 17 if the received pulse occurs exactly midway of the width of the gating pulse, such that, when this condition occurs, the biasing number would be cancelled by the pulses passed by the circuit 17. The number appearing in the register 13 is added to the number in the register 12 under the control of the control pulses supplied along line 15 whilst being retained in the register 13. This number is scaled down by the register 12 and is supplied to the register 11 to modify the number stored in the latter in the sence to cause the period of time represented thereby to correspond with the actual time between the transmitted pulse and the corresponding received pulse. Suitable damping means represented by the block 19 is supplied across the digital integrator 10 or parts thereof. The number stored in the register 11 may at any time be read out along line 20 or passed to a digital computer.

It will be appreciated from the above description that the number stored in the register 11 always represents the range of the target and is continually being modified as the range changes in the sense to cause the received pulses to stand substantially midway of the gating pulse derived from the termination of the countdown of the number in register 16.

It will also be appreciated that the number stored in the register 13 is effectively integrated into the registers 12 and 11 to represent target range and therefore approximately represents target velocity, the approximation factor being due to the damping provided.

It will further be appreciated that the digital system described can be made to possess a memory, to search for a target before locking-on, to reject a slow target, to search quickly through rain clutter, to distinguish to some extent between random noise and true target pulses and to perform all the usual functions which may be required of an automatic tracking system.

The radar tracking system illustrated in FIG. 3 embodies the system illustrated in FIG. 2 and like reference numerals are used to indicate like parts. In this example, the number in the range register 11 is supplied through a transfer and store device 20a to the strobe producing register 16 every radar period. The number in the strobe producing register 16 is counted down every radar period by clock pulses derived from a crystal controlled clock pulse generator 21, one output of which is supplied through a scaling down unit 22 to one input of a three-input AND gate 23. The scaling down unit 22 may divide the pulse recurrence frequency of the clock-pulse by any selected factor of two and, in practice, it may even be omitted. A second input to the AND gate 23 is derived from a bistable device 24 which is reset every radar period to energise such second input. The third input to the AND gate 23 is derived from another bistable device 25 which is reset every radar period to de-energise the third input to the gate 23 and is arranged to change its state upon the occurrence of a transmitted radar pulse derived from transmitter unit 25a to energise the third input to the gate 23. Thus upon the occurrence of a transmitted radar pulse, the second and third inputs to the gate 23 are energised and the gate is enabled to pass to the register 16 the clock pulses supplied to the first input of the gate 23.

At the termination of count-down of the number in the register 16 an output signal is supplied to a mono-stable device 26 to generate a gating pulse of predetermined width which is supplied to the bi-stable device 24, to a two-input gate 27 (which corresponds in function to the gate 17 of FIG. 2) and to one input of a three-input AND gate 28.

The effect of the gating pulse on the bistable device 24 is to change the state of the latter to de-energise the AND gate 23 and stop the further supply of clock pulses to the register 16. The effect of the gating pulse on the AND gate 28 is to energise one input thereof and the effect of the gating pulse on the gate 27 is to enable the latter to pass a signal representing the received pulse when, and only when, the received pulse arrives during the duration of the gating pulse.

The clock pulse generator 21 also supplies clock pulses to a second input of the gate 28 and the third input of the latter is connected to a bistable device 29 which is reset every radar period to energise the third input to the gate 28. Thus, the occurrence of a gating pulse from the mono-stable device 26 energises the first input to the gate 28 and, as the third input is already energised by the bistable device 29, the gate 28 will commence to pass clock-pulses as soon as the gating pulse is produced, i.e. at the termination of count-down of the register 16. The output from the gate 27 is arranged to change the state of the bistable device 29 to de-energise the third input to the gate 28 and prevent the latter passing further clock-pulses. The number of clock-pulses passed by the gate 28 therefore represents the difference in time between the appearance of the leading edge of the gating pulse from the mono-stable device 26 and the occurrence of the received signal and these clock pulses are fed from the gate 28 to the register 18. As it is required that the received pulse should occur at any selected position in the width of the gating pulse, usually mid-way, it will be apparent that the gate 28 will pass a number of pulses to the register 18 even when the received pulse is in its desired position in time relative to the gating pulse. This effect is however compensated by the provision of a bias register 18a which stores a number corresponding to the number of pulses supplied to the register 18 when the received pulse is in its correct position in time relative to the gating pulse. Similar results may, of course, be achieved by permanently providing the register 18 with an inbuilt bias.

The change of state of the bistable device 29 due to the occurrence of a received pulse within the width of a gating pulse is arranged to energise one input of a three-input AND gate 30 and to provide a signal to a "target present circuit" 31 which circuit includes a Schmidt trigger circuit 32 controlling a mono-stable device 33 to maintain an output from the latter for as long as the number of received pulses per unit time is greater than a predetermined value which is conveniently one-half of the number of transmitted pulses in the same unit of time. This enables the system to remain locked on to a selected target even though a small number of reflected pulses may be lost to the system. The output from the circuit 31 is supplied to the second input of the gate 30 and also causes a further bistable device 34 to assume a condition in which it supplies a signal to a delay circuit 35 affording a delay of, for example, 0.25 second, and also causes another bistable device 36 to assume a condition in which it energises the third input to the gate 30, and also enables a further gate 37 to pass control pulses supplied along line 15. Thus, with the three inputs to the gate 30 energised, the latter provides a signal in every radar period enabling gates 38 and 39, which are associated respectively with the register 18 and the bias register 18a, to supply the numbers stored in these registers to the register 13, the number in the register 18 being added to that already in the register 13 and the bias number in the register 18a being subtracted from that already in the register 13. The accumulated number in the register 13 is supplied periodically to the register 12 through adder device or gate 14 at a frequency corresponding to that of the control pulses along line 15 whilst being at the same time being retained in the register 13 which is effectively an integrator.

The register 12 accumulates to the numbers supplied thereto from the register 13 and when such accumulated number falls outside selected limits it provides an output to the range register in the appropriate sense to modify the number in the range register in the sense to reduce the difference between the range represented thereby and the actual target range detected by the system. This in turn changes the occurrence in time in the termination of count-down of the register 16 and hence the initiation of the gating pulse from the mono-stable device 26 in the sense to bring the received pulse more nearly into its correct relationship with the gating pulse.

A damping factor is introduced into the system, this factor being derived from the outputs of the gates 38 and 39 and being supplied to the range register 11 after suitable scaling.

When the system is locked on to a target, the number in the range register 11 represents the range of the target and the number in the register 13 represents the velocity of the target. The system may tend to lock on to a target which is moving at such a low velocity as to clearly indicate that it is not a true target. Such a false target may, for example, be rain clutter and the system is arranged to identify and reject such a false target by the provision of a "slow target rejection circuit" 40 which is connected between the delay circuit 35 and the bistable device 36. The rejection circuit 40 is supplied, by threshold means 41, with a signal from the velocity register 13 when the number stored therein falls below a selected value representing a selected minimum target velocity. If the system locks on to such a false target, the signal from the threshold means 41 enables the circuit 40 to pass the signal from the delay circuit 35 to change the state of the bistable device 36 and hence de-energises the third input to the gate 30 and also de-energises the gate 37. This prevents the registers 18 and 18a being read out and also prevents the information in the velocity register 13 being supplied to the register 12. It also has the further effect through line 44 of enabling gates 42 and 43 to pass signals from a sweep generator 45 to the range register 11 to vary the range number in a selected pattern so that the system commences to scan for a target. If, however, the system locks on to a true target, then the signal from the delay circuit 35 is not passed by the rejection circuit and becomes lost so that the system remains locked on.

It may happen, that the system will lose a target to which it has been locked. In such event, the mono-stable device 33 of the circuit 31 returns to its initial condition and provides a signal to a two-input AND gate 46 the other input of which is energised by the bistable device 34. This produces an output which is supplied to a memory circuit 47 which may take any suitable form and functions as a delay unit. The memory circuit, in this example, is shown as an integrator provided by an amplifier 48 and a parallel connected capacitor 49 and controls a Schmidt trigger circuit 51 which functions as a mono-stable device indicated at 50, the device 50, in practice, being superfluous. As the voltage from the integrator 48, 49 builds up, it will, after a predetermined period of time, for example two seconds, trigger the mono-stable device 50 to provide a signal returning the bistable device 36 to its initial condition thereby bringing the system off lock by closing the gates 30 and 37. During this interval of time, however, assuming no pulses are received, the gates 28 and 30 remain closed but the gate 37 remains open so that the number in the register 13, which represents the last known velocity of the target, continues to be transferred to the register 12 under the control of the control pulses along line 15. This has the effect of changing the number in the range register 11 at a rate corresponding to the last known velocity of the target and the system attempts to follow the now unseen target at its last known velocity. If the system fails to find the target during the delay period provided by the memory circuit 47, then it comes off lock as described above and is available for selecting a further target. If, however, the system finds the target during the memory period, the mono-stable device 33 changes its state to de-energise the gate 46 and the voltage build-up in the memory circuit 47 ceases and decays so that the mono-stable device 50 remains in its initial condition and the system remains locked on to the target.

It will be appreciated that the system described may be controlled by an operator presented with target information in visual form and, by means of a conventional type joy-stick control, selecting the target to be tracked, the joy-stick control controlling the sweep register 45 to select the number initially stored in the range register 11 as an approximation of the target range and the sweep register 45 thereafter automatically varying the number in the range register 11 in a selected pattern to sweep the range broadly identified by the operator until the system locates and locks on to the target.

It will also be appreciated that the tracking system described above can be made to provide a more accurate measure of range than conventional analogue systems as it utilises clock pulses which may be derived from a crystal oscillator. It also provides increased reliability and microminiaturization and solid state techniques may readily be applied.

I claim:
1. A radar tracking system for deriving a measure of the range of a target as a function of the time interval between the transmission of a pulse of energy and receipt of the corresponding reflected pulse, which comprises a first register for storing a number which represents, at least approximately, the target range, means responsive to the transmission of a pulse to commence to count the stored number digitally, means responsive both to the termination of the count and receipt of the corresponding reflected pulse to derive a number of pulses corresponding in number to the difference between the time interval represented by the stored number and the actual time interval, a velocity register supplied in every radar period during which the system is tracking a target with a number corresponding to the number of derived pulses to accumulate such a number and an overflow register supplied at a predetermined frequency with the accumulated number to supply a signal to the first register when the number in the overflow register falls outside predetermined limits, the signal modifying the number in the first register in the sense to reduce said difference.

2. A system according to claim 1 wherein said first register comprises a range register in which said stored number is substantially continuously available and a count-down register in which the stored number is counted.

3. A system according to claim 1 including means responsive both to the initial identification of a target by receipt of a predetermined minimum number of received pulses per unit time and to the accumulated number in the velocity register having a value lower than a selected minimum value to reject the target and free the system for further target selection.

4. A system according to claim 1 including means responsive to loss of target by failure to detect reflected pulses to continue to modify the stored number at a rate corresponding to the number of derived pulses resulting from the last received pulse for a limited period of time.

5. A system according to claim 1 including means responsive to termination of the count to generate a gating pulse of predetermined width.

6. A system according to claim 5 wherein the gating pulse generating means comprises a first mono-stable device.

7. A system according to claim 5 wherein the pulse deriving means responsive both to termination of the count and receipt of a reflected pulse comprises a clock pulse generator and a second gate supplied with clock pulses from said generator and arranged to be enabled by the occurrence of said gating pulse and closed by receipt of said reflected pulse.

8. A system according to claim 7 wherein said second gate is a three-input AND gate to one input of which is applied the clock pulses, to the second input of which is applied the gating pulse and the third input of which is arranged to be energised in every radar period until the receipt of the reflected pulse.

9. A system according to claim 8 wherein the third input of the second gate is connected to a third bistable device arranged to be reset in every radar period to one condition in which said third input is energised and responsive to the occurrence of a received pulse during the duration of a gating pulse to change to the other condition and de-energise said third input and close said second gate.

10. A system according to claim 9 including a third gate supplied with said gating pulse and a signal representing said received pulse and operable upon the occurrence of a received pulse during the duration of said gating pulse to cause said third bistable device to assume said other condition.

11. A system according to claim 10 including a second register for counting said number of derived pulses, a velocity register, and a fourth gate responsive to said third bistable device assuming said other condition to transfer the number counted by the second register to the velocity register.

12. A system according to claim 11 including means for modifying the number transferred to said velocity register by an amount corresponding to a selected position in time of the received pulse relative to the leading edge of the gating pulse.

13. A system according to claim 12 wherein the number modifying means comprises a biasing register responsive to said third bistable device assuming said other condition to transfer to said velocity register a biasing number representing said amount.

14. A system according to claim 13 including fifth and sixth gates associated respectively with said second and biasing registers and enabled by the response of said fourth gate to said third bistable asuming said other condition to transfer the counted number and the biasing number to said velocity register.

15. A system according to claim 11 including circuit means responsive to said third bistable device assuming said other condition a predetermined minimum number of times per unit time to enable said fourth gate to respond to said third bistable device assuming said other condition.

16. A system according to claim 15 wherein said fourth gate is a three-input AND gate one input of which is enabled in response to said third bistable device assuming said other condition and the second input of which is enabled by the response of said circuit means to said third bistable device assuming said other condition a predetermined minimum number of times per unit time and wherein a fourth bistable device and a fifth gate are provided, said fourth bistable device being arranged to assume one condition upon said circuit means enabling said second input to enable the third input of said fourth gate and to enable said fifth gate for the passage of control pulses.

17. A system according to claim 16 including an overflow register supplied with the number accumulated in said velocity register when said fifth gate is enabled at a frequency determined by that of said control pulses and arranged when the number in the overflow register attains a value outside a predetermined range to modify the number stored in said first register in the appropriate sense.

18. A system according to claim 16 including a fifth bistable device arranged to assume one condition upon said fourth bistable device assuming said one condition to enable said third input of said fourth gate and to enable said fifth gate.

19. A system according to claim 18 including target rejection means, a delay circuit responsive to said fourth bistable device assuming the one condition to pass a signal, after a selected delay period, to said target rejection means and means responsive to the number accumulated in the velocity register falling below a selected minimum value to enable said rejection means to pass said delayed signal and cause said fifth bistable device to assume the other condition in which said fourth and fifth gates are closed.

20. A system according to claim 19 including a sweep register responsive to said fifth bistable device assuming said other condition to modify the number stored in said first register in a selected pattern to enable the system to search for a target.

21. A system according to claim 18 wherein said circuit means is arranged to provide an output signal upon failure of said third bistable device to assume said other condition, said predetermined minimum number of times per unit time and wherein a memory circuit is provided responsive to the occurrence for a predetermined period of time of said output signal from said circuit means to cause said fifth bistable device to assume said other condition after said predetermined period of time thereby to close said fourth and fifth gates.

22. A radar tracking system for deriving a measure of the range of a target as a function of the time interval between the transmission of a pulse of energy and receipt of the corresponding reflected pulse, which comprises a first register for storing a number which represents, at least approximately, the target range, a clock pulse generator, a first gate for passing clock pulses from said generator to said first register, a first bistable device operable in each radar period in response to a transmitted pulse to enable said first gate and commence to count the stored number digitally, means responsive both to the termination of the count and receipt of the corresponding reflected pulse to derive a number of pulses corresponding in number to the difference between the time interval represented by the stored number and the actual time interval and means for modifying the stored number in accordance with the number of derived pulses in the sense to reduce said difference.

23. A system according to claim 22 including means responsive to termination on the count to close said first gate.

24. A system according to claim 23 wherein said means responsive to termination of the count comprises a second bistable device arranged to be reset in each radar period to enable said first gate and responsive to termination of the count to close said first gate.

25. A radar tracking system for deriving a measure of the range of a target as a function of the time interval between the transmission of a pulse of energy and receipt of the corresponding reflected pulse, which comprises a range register for storing a number which represents, at least approximately, the target range, a count-down register supplied in each radar period with said stored number, means responsive to the transmission of a pulse to commence to count the stored number digitally in said count-down register, means responsive both to the termination of the count and receipt of the corresponding reflected pulse to derive a number of pulses corresponding in number to the difference between the time interval represented by the stored number and the actual time interval, and means for modifying the number stored in said range register in accordance with the number of derived pulses in the sense to reduce said difference.

26. A radar tracking system for deriving a measure of the range of a target as a function of the time interval between the transmission of a pulse of energy and receipt of the corresponding reflected pulse, which comprises a first register for storing a number which represents, at least approximately, the target range, means responsive to the transmission of a pulse to commence to count the stored number digitally, means responsive to termination of the count to generate a gating pulse of predetermined width, a clock pulse generator, a gate supplied with clock pulses from said generator and arranged to be enabled by the occurrence of said gating pulse and closed by receipt of said reflected pulse to derive a number of pulses representing the difference between the time interval represented by the stored number and the actual time interval and means for modifying the stored number in accordance with the number of derived pulses in the sense to reduce said difference.

References Cited by the Examiner

UNITED STATES PATENTS 3,035,263   5/1962   Lader et al. _____ 343—5
3,075,189   1/1963   Lisicky _____ 343—7.3

FOREIGN PATENTS 750,005   6/1956   Great Britain.

CHESTER L. JUSTUS, *Primary Examiner.*

LEWIS H. MYERS, *Examiner.*

ERIC T. S. CHUNG, THEODORE H. TUBBESING,
*Assistant Examiners.*